United States Patent [19]

Getson, Jr. et al.

[11] 4,161,778
[45] Jul. 17, 1979

[54] SYNCHRONIZATION CONTROL SYSTEM FOR FIRMWARE ACCESS OF HIGH DATA RATE TRANSFER BUS

[75] Inventors: Edward F. Getson, Jr., Lynn, Mass.; John H. Kelley, Nashua, N.H.; Donald J. Rathbun, Andover, Mass.; Albert T. McLaughlin, Hudson, N.H.

[73] Assignee: Honeywell Information Systems, Inc., Waltham, Mass.

[21] Appl. No.: 816,985

[22] Filed: Jul. 19, 1977

[51] Int. Cl.² .............................................. G06F 3/06
[52] U.S. Cl. .................................... 364/200; 364/900
[58] Field of Search ... 364/200 MS File, 900 MS File

[56] References Cited

U.S. PATENT DOCUMENTS

| 3,351,917 | 11/1967 | Shimabykuru | 364/900 |
| 3,710,327 | 1/1973 | Books et al. | 364/200 |
| 4,038,642 | 7/1977 | Bouknecht et al. | 364/900 |
| 4,053,950 | 10/1977 | Bourke et al. | 364/200 |

*Primary Examiner*—Harvey E. Springborn
*Attorney, Agent, or Firm*—Gerald E. Lester; Nicholas Prasinos; Ronald T. Reiling

[57] ABSTRACT

In a data processing system wherein a plurality of functional units are interconnected by way of a common communication bus in an environment of high data transfer rates, a logic control system is provided for interjecting firmware control during a data transfer between a disk device and main memory to accommodate unsolicited bus requests without incurring data errors or compromising the data transfer rate. Data transferred between the disk device and a disk controller interfacing directly with the common bus is routed through a FIFO (first-in-first-out) buffer under hardware control. The buffer signals the absence of data in its input register and the presence of data in its output register. The signals are logically combined and ANDed with a firmware controlled logic gate to indicate the occurrence of data transfer states. During such transfer states, data is transferred under hardware control between the FIFO buffer and main memory. When the input register of the FIFO buffer is filled during a data transfer from main memory to the disk device, or when the FIFO buffer is empty during a transfer of data from the disk device to main memory, hardware controlled data transfers are not required. In that event the firmware control system is permitted to access the common bus to service unsolicited bus requests.

5 Claims, 5 Drawing Figures

SYNCHRONIZATION CONTROL SYSTEM FOR FIRMWARE ACCESS OF HIGH DATA RATE TRANSFER BUS

BACKGROUND OF THE INVENTION

1. Field of the Invention

The invention relates to data transfer control systems for routing data between mass storage devices and main memory in a data processing system, and more particularly to a synchronization logic control system for multiplexing bus control between a hardware control system and a firmware control system without incurring data errors or affecting the data transfer rate.

2. Prior Art

In data processing systems wherein a plurality of functional units are electrically coupled by a common communication bus, extremely complex hardware and firmware synchronization control systems have been required to share the common bus between hardware and firmware during a high data rate transfer. When unsolicited bus requests requiring firmware interaction have occurred during the data transfer, the synchronization control systems have been required to track the data at the byte level in order to assure that no underrun or overrun errors occur when the firmware is allowed to access the common bus. As the data transfer rate increases, the timing of the synchronization control system becomes more critical and additional complexity in the control system network has been required. In seeking alternatives to the added complexity, system designers have had to sacrifice the data transfer rates.

The present invention is directed to a simplistic synchronization control system wherein the data transfer on a common communication bus may be interrupted for firmware accommodation of unsolicited bus requests without incurring data errors or affecting the transfer rate. The need for complex logic circuitry or increased firmware control storage is obviated.

SUMMARY OF THE INVENTION

A logical synchronization control system for a data processor having functional units interconnected by a common communication bus is provided, wherein access to the bus by a firmware control system may be permitted during a hardware controlled data transfer without sacrificing transfer rates or incurring data errors.

More particularly, a logic control system issues data strobes under hardware control to accommodate the transfer of data between main memory and a mass storage device. Data is routed through a FIFO (first-in-first-out) buffer in the logic control system in response to the data strobes. When no data transfer is required between main memory and the FIFO buffer to accommodate the data transfer rate, the firmware control system is alerted to acknowledge and service unsolicited bus requests on the common bus. When a data transfer between the FIFO buffer and main memory is required, however, data strobes again are generated and bus control is transferred from firmware to hardware. The process is repeated until the data transfer between main memory and the mass storage device is completed.

DESCRIPTION OF THE DRAWINGS

The novel features believed characteristic of the invention are set forth in the appended claims. The invention itself, however, as well as further objects and advantages thereof, will be best understood by reference to the following detailed description of an illustrative embodiment, when read in conjunction with the accompanying drawings wherein:

DESCRIPTION OF THE PREFERRED EMBODIMENT

FIG. 1

Figure 1:
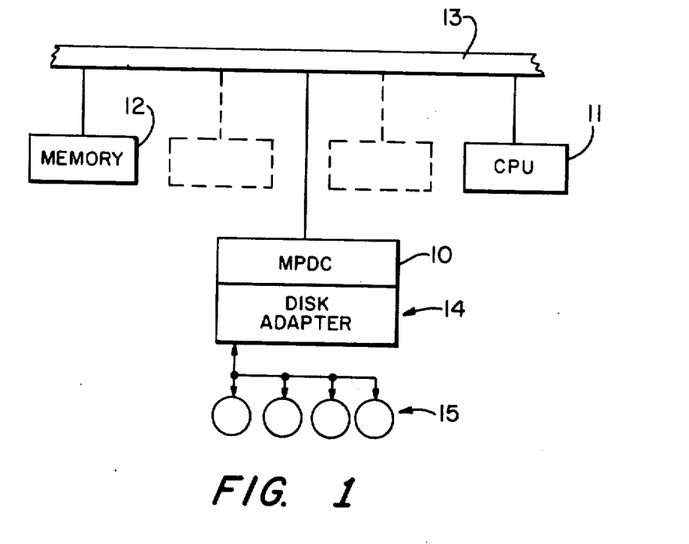
FIG. 1 is a functional block diagram of a data processing system embodying the invention.

FIG. 1 illustrates in functional block diagram form a computer system having a medium-performance disk controller (MPDC) 10 in electrical communication with a central processor unit 11 and a memory unit 12 by way of a common communication bus 13. The MPDC 10 is a microprogrammed peripheral control subsystem for storing and retrieving data from mass storage media. The controller includes a Read Only Store (ROS) memory to be later described which contains microprogram instructions, and communicates with mass storage adapters such as the disk adapter 14. Adapter 14 has the facility to support four daisy-chained disk devices 15.

The communication bus 13 provides an information path between any two units in the system. The bus is asynchronous in design, thus enabling units of various speeds to operate efficiently. The bus accommodates information transfers including communication requests, control commands, status signals and data transfers between memory 12 and disk devices 15.

Any system unit wishing to communicate requests a bus cycle. When that bus cycle is granted, the requesting unit becomes the master and the addressed system unit becomes the slave. Some bus interchanges require a response cycle as well as a request cycle. By way of example, the master unit may identify itself to a slave unit and indicate that a response is required. When the required information becomes available, the slave assumes the role of master and initiates a transfer to the requesting unit.

In the servicing of bus cycle requests, the central processor has the lowest priority, the MPDC 10 has the next lowest priority, and the memory 12 has the highest priority.

A more detailed description of the system of FIG. 1 is given in U.S. Pat. No. 3,993,981 which is assigned to the assignee of the present invention, and which is incorporated by reference herein.

FIG. 2

Figure 2:
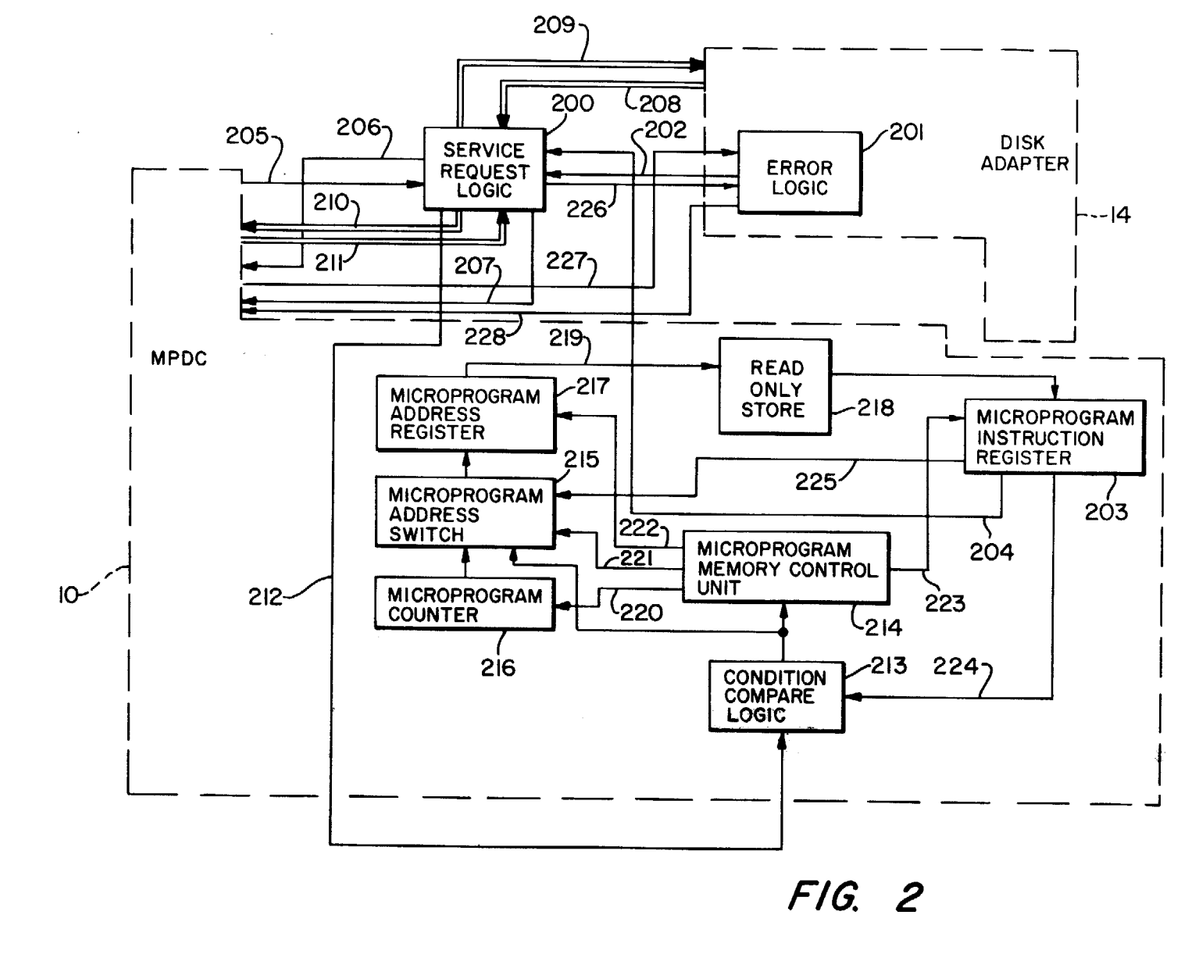
FIG. 2 is a more detailed functional block diagram of the disk controller and disk adapter of FIG. 1.

FIG. 2 illustrates in a more detailed block diagram form the MPDC 10, the disk adapter 14, and a service request logic unit 200 which embodies the invention.

The service request logic unit 200 receives error signals by way of a control line 202 from an error logic unit 201 in a disk adapter 14. Unit 200 also receives control signals from a microprogram instruction register 203 by way of a control line 204, and data transfer range and control signals from MPDC 10 by way of a conducting cable 205. The logic unit 200 supplies data requests to the MPDC 10 by way of a control line 206 and data strobes to the MPDC by way of a control line 207. Signal data is received from the disk adapter 14 on a data cable 208, and supplied to the disk adapter on a data cable 209. Further, parallel data transfers between the logic unit 200 and MPDC 10 occurs on data cables 210 and 211.

When a time period occurs during which a firmware control system may be permitted to access the common bus 13, logic unit 200 issues a status signal along a conducting line 212 leading to a condition compare logic unit 213. The output of the logic unit 213 is supplied to a microprogram memory control unit 214 and to a microprogram address switch unit 215. A second input to switch unit 215 is connected to the output of a microprogram counter 216. The output of the switch unit is applied to a microprogram address register 217 which addresses a Read Only Store (ROS) 218 by way of an address cable 219. The output of the ROS 218 is applied to the microprogram instruction register 203.

The control unit 214 supplies control signals to counter 216 by way of a control line 220, to switch unit 215 by way of a control line 221, to register 217 by way of a control line 222, and to register 203 by way of a control line 223. The register 203 also supplies control signals to logic unit 213 by way of a control line 224, and to switch unit 215 by way of a control line 225.

During a data transfer, catastrophic errors such as data transfer rate errors, timing errors and disk drive inhibits may occur. The error logic unit 201 monitors the data flow through logic unit 200 by way of a control cable 226, and receives error information from MPDC 10 on a control cable 227. The logic unit 201 flags the occurrence of errors by issuing error control signals to line 202 and to a control cable 228 leading to MPDC 10.

In operation, data may be transferred from memory 12 of FIG. 1 to the MPDC 10, and hence by way of data cable 211 to logic unit 200. From logic unit 200, the data is supplied serially by way of data cable 209 to the disk adapter 14. When data is to be supplied from a disk device to memory 12, the data is applied serially from disk adapter 14 to data cable 208 leading to logic unit 200. Unit 200 in turn supplies the data in parallel along data cable 210 leading to the MPDC 10. During the data transfer, the logic unit 200 requests byte transfers from MPDC 10 by way of control line 206 or indicates the presence of data ready for transfer by way of control line 207. When a reserve memory unit in logic unit 200 is filled, the logic unit issues a signal on line 212 to the condition compare logic unit 213.

Sequences of microinstructions comprising a microprogram are stored in the ROS memory 218. Under the control of the microprogram memory control unit 214, the count of the microprogram counter 216 is loaded into the microprogram address register 217 to address a particular microinstruction in memory 218. The addressed microinstruction is loaded into the microprogram instruction register 203 to set input and output switches directing the flow of data, and to provide control signals at the elemental machine instruction level to direct the operation of the functional units comprising the data processing system of FIG. 1. At the end of the activity directed by the microprogram control signals, the counter 216 is stepped by the control unit 214 and loaded into the address register 217 to address a next microinstruction in memory 218. A sequence of microinstructions thereby may be executed.

When sequencing of microinstructions depends upon conditions that arise during data processing, there is a condition field in the sequence of microinstructions. This field activates the logic unit 213 by way of control lines 224, thereby permitting the control line 212 to be sampled and compared. In response to a condition field signal on line 224, the address switch 215 alters the output of the microprogram counter 216 to construct a next microinstruction address. A new microinstruction sequence thereby is addressed in memory 218.

FIG. 3

Figure 3:
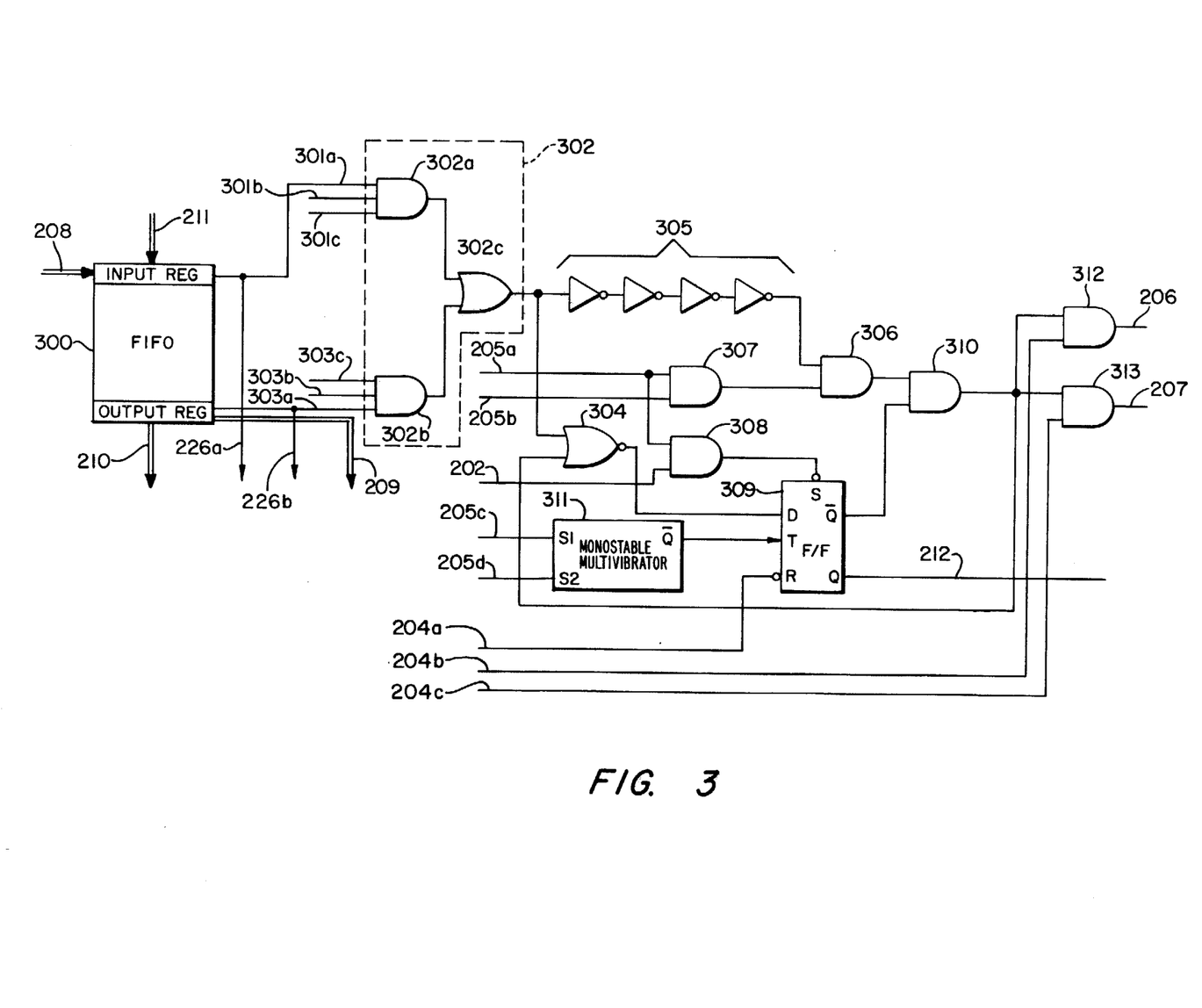
FIG. 3 is a logic schematic diagram of the invention.

FIG. 3 is a detailed logic schematic diagram of the service request logic unit 200 of FIG. 2.

Referring to FIG. 3, a first-in-first-out (FIFO) buffer 300 receives serial data from disk adapter 14 on data cable 208, or data in parallel form from MPDC 10 on data cable 211. In the preferred embodiment described herein, buffer 300 has a 16-byte capacity, and is of a type manufactured and sold by Fairchild Semiconductor of Mountain View, Calif. as model 9403. Data bytes are received by the input register of buffer 300, and shifted through the buffer to the output register at a rate determined by the fall through time between the registers. The output register supplies the data in parallel form to data cable 210 leading to MPDC 10, or in serial form to data cable 209 leading to the disk adapter 14.

When the input register of buffer 300 is empty, a logic one signal is issued to a control line 226a of cable 226 and to a control line 301a leading to one input of an AND gate 302a. Further, when the output register is filled, a logic one signal is issued to a control line 226b of cable 226, and to a control line 303a leading to one input of an AND gate 302b. AND gate 302a also receives a write to disk control signal from MPDC 10 on a control line 301b when data is to be transferred from main memory 12 to disk adapter 14. In addition, gate 302a receives logic zero end of data field signals on a control line 301c leading from the disk adapter 14. AND gate 302b further receives an enabling control signal from MPDC 10 on a control line 303b, and a logic one read signal from the MPDC on a control line 303c when data is to be read from disk storage.

The outputs of AND gates 302a and 302b are connected to corresponding inputs of an OR gate 302c. Gates 302a–302c comprise a logic array 302. The output of array 302 is applied to one input of a NOR gate 304, and through four serially connected inverters 305 to one input of an AND gate 306. A second input to gate 306 is connected to the output of an AND gate 307, one input of which is connected to one input of an AND gate 308 and to a control line 205a of cable 205 leading to output terminals of MPDC 10. A second input to gate 307 is connected to a control line 205b of cable 205, and a second input to AND gate 308 is connected to control line 202 leading to error logic unit 201 of FIG. 2. The output of gate 308 is connected to the set input of a flip-flop 309.

The D input to flip-flop 309 is connected to the output of NOR gate 304, a second input of which is connected to the output of an AND gate 310. The T trigger input to flip-flop 309 is connected to the $\overline{Q}$ output of a one-shot multivibrator 311, the S1 and S2 set inputs of which are connected to outputs of MPDC 10 by way of control lines 205c and 205d, respectively, of cable 205. The reset input to flip-flop 309 is supplied by instruction register 203 by way of a control line 204a of cable 204. The Q̄ output of flip-flop 309 is connected to one input of AND gate 310, the second input of which is connected to the output of AND gate 306. The Q output of flip-flop 309 is connected to control line 212 leading to the condition compare logic unit 213 of FIG. 2.

The output of AND gate 310 also is applied to one input of an AND gate 312 and to one input of an AND gate 313. A second input to AND gate 312 is supplied by instruction register 203 by way of a control line 204b, and a second input to AND gate 313 is supplied by the instruction register by way of a control line 204c. The output of AND gate 312 is connected to control line 206 leading to MPDC 10, and the output of AND gate 313 is connected to control line 207 also leading to the MPDC.

In operation, when data is to be read from the memory 12 of FIG. 1 to the disk adapter 14, MPDC 10 sets up the required data path. Data thereafter is loaded from the MPDC 10 to the disk adapter 14 via the logic system of FIG. 3.

In initializing the system the firmware control system of FIG. 2 applies a logic one level to control line 204a to free the flip-flop 309 for triggering by the one-shot multivibrator 311. The firmware control system also applies a logic one signal to line 204b to enable gate 312, and a logic zero signal to line 204c to disable gate 313. The MPDC 10 applies a logic one range signal to line 205a to enable gates 307 and 308, and a logic one signal to line 205b to acknowledge a data transfer condition. Further, the MPDC 10 applies a positive-going logic one pulse to the S1 input of multivibrator 311 by way of control line 205c when a data byte is strobed into the input register of buffer 300. The MPDC also applies a logic zero level to the S2 input of multivibrator 311 by way of control line 205d, logic one levels to lines 301b and 301c, and logic zero levels to lines 303b and 303c.

When a logic one pulse is applied to the S1 input of multivibrator 311, the Q̄ output of the multivibrator transitions from a logic one level to a logic zero level. The Q̄ output remains at a logic zero level as long as the S1 input is successively strobed at 0.5 microsecond intervals. Prior to system initialization, the reset input to flip-flop 309 is enabled. The Q̄ output of the flip-flop thereupon transitions to a logic one level to enable gate 310. After system initialization, the reset input of flip-flop 309 is disabled. As long as the Q̄ output of multivibrator 311 remains at a logic zero level, however, the flip-flop is not triggered and the Q̄ output of the flip-flop remains at a logic one level.

The input register of the FIFO buffer 300 supplies a logic one status signal to line 301a during time periods in which the register is empty. With lines 301b and 301c at logic one levels, the input register status signal is applied through OR gate 302c and inverters 305 to an input of AND gate 306.

The MPDC 10 range count signal applied to line 205a remains at a logic one level until the transfer of data between main memory 12 and disk adapter 14 is complete. The output of gate 307 is thus at a logic one level to enable gate 306. The logic one signal at the output of inverters 305, therefore, is applied through gates 306, 310 and 312 to request a data byte from MPDC 10. If data from main memory 12 is available, the MPDC issues a logic one pulse to the S1 set input of multivibrator 311 to maintain the Q̄ output thereof in a logic zero state.

When the requested data byte is applied to the input register of buffer 300 by way of data cable 211, line 301a transitions to a logic zero level to disable gate 310. Thus no further data requests are made until the data byte is transferred from the input register into the FIFO stack. At that time, the input register again is emptied and line 301a transitions to a logic one level to again raise the output of AND gate 310 to a logic one level. An additional data byte thereby is requested from the MPDC 10, and the hardware again strobes the S1 set input of the multivibrator. An additional data byte then is transferred by way of data cable 211 to the input register of buffer 300. The process is repeated until 16 bytes of data have been placed into the FIFO buffer.

When the buffer 300 is filled, lines 226a and 301a transition to a logic zero level, and lines 226b and 303a transition to a logic one level. Further, AND gate 302a is disabled as is gate 310, and no further data requests can be made. The MPDC 10 senses that no data requests have occurred within a time period of 0.50 microseconds, and ceases to strobe the S1 set input of multivibrator 311. The multivibrator thereupon times out, and the Q̄ output thereof transitions from a logic zero to logic one level to trigger the flip-flop 309. Since the output of NOR gate 304 is at a logic one level, the Q̄ output of the flip-flop transitions from a logic one to a logic zero level and the Q output thereof transitions to a logic one level.

The firmware of FIG. 2 continually senses line 212 each 500 nanoseconds in a two microinstruction sequence. When the line 212 transitions from a logic zero to a logic one level, firmware is alerted that the common bus 13 may be accessed to accommodate unsolicited bus requests without causing data errors. Upon sensing the logic one level on line 212, firmware resets flip-flop 309 by applying a logic zero signal to line 204a to prevent further triggering by the multivibrator 311. The Q̄ output of the flip-flop thereupon transitions from a logic zero to a logic one state to enable gate 310.

During the period that the logic system of FIG. 3 is retained in a quiescent state, the firmware acknowledges unsolicited bus requests on the common bus 13 of FIG. 1. While the firmware is responding to the bus requests, data in the FIFO buffer 300 continues to be transferred serially from the output register. When the input register of the FIFO buffer is empty, the output of gate 302a transitions to a logic one level which is gated through AND gates 310 and 312 to request an additional data byte from MPDC 10. The firmware control system of MPDC 10 thereupon applies a logic one level to line 204a to permit the flip-flop 309 to respond to trigger pulses from multivibrator 311. The MPDC hardware again strobes the S1 set input of multivibrator 311, and the above-described process is repeated until the full range of date bytes from the MPDC 10 to the disk adapter 14 has been transferred. When the transfer is complete, line 205a transitions to a logic zero level to disable gates 307, 306 and 310. The logic system then enters a quiescent state in which no further data transfers are requested.

When data is to be transferred from the disk adapter 14 to MPDC 10, the MPDC applies logic zero signals to lines 301b and 301c and logic one signals to lines 303b and 303c. Gate 302a thereby is disabled and gate 302b is enabled. The MPDC also applies a logic zero level to line 205c to disable the S1 set input to multivibrator 311. Further, the MPDC applies a logic zero level to the line 204b to disable gate 312 and applies a logic one level to line 204c to enable gate 313. Byte data transfer strobes at the output of gate 310 thereby are applied through gate 313 to the MPDC. The remainder of the system initialization is as before described.

At the time lines 303b and 303c transition to a logic one level, the MPDC 10 requests a first data byte from the disk adapter 14. Further, the firmware control system enables the reset input to flip-flop 309, thereby disabling the trigger input of the flip-flop and enabling gate 310. During the data transfer, serial data is received from the disk adaptor 14 by way of data cable 208, and applied through input register of the buffer 300 to the output register. As the buffer 300 is being filled, the firmware control system accesses common bus 13 to service unsolicited bus requests.

The time period during which the firmware control system is permitted to service bus requests is determined by the difference in the rate at which the FIFO buffer 300 is filled, and the rate at which the MPDC empties the buffer. As the serial data flow from disk adaptor 14 on cable 208 is at a 2.50 MHz bit transfer rate, and the parallel data flow on cable 210 is at a 2.00 MHz byte transfer rate, the MPDC may empty the buffer 300 faster than the disk adapter supplies data. The firmware thus is provided the time period between an emptying and refilling of the buffer to service unsolicited requests.

When the buffer 300 is refilled, the line 303a transitions to a logic one level which is reflected at the output of AND gate 310. A data strobe thereby is supplied to the MPDC 10 via gate 313 to empty the buffer. The firmware control system of MPDC 10 thereupon raises the line 204a to a logic one level to enable the trigger input of flip-flop 309. Further, the MPDC strobes the S2 set input of multivibrator 311 with negative-going logic zero pulses to transition the Q output of the multivibrator from a logic one to a logic zero level. The $\overline{Q}$ output remains at a logic zero level as long as the S2 input of the multivibrator is strobed each 0.50 microseconds. The $\overline{Q}$ output of flip-flop 309 thus remains at a logic one level to enable gate 310. Control of the common bus 13 thus switches from firmware to hardware, and the MPDC accesses the output register of buffer 300 to empty the buffer. When the output register of buffer 300 is empty of data, lines 226b and 303a transition to a logic zero level which is reflected at the output of gate 310. The MPDC 10 thereupon ceases to strobe the S2 set input of multivibrator 311, and the multivibrator times out. Flip-flop 309 is triggered thereby, and the Q output of the flip-flop transitions to a logic one level which is sensed by the firmware control system. The firmware thereupon enables the reset input of the flip-flop, and accesses the common bus 13 to service bus requests. The serial data flow to the FIFO buffer 300 continues in an uninterrupted flow and the above described process is repeated until the data transfer is complete.

If catastrophic errors such as a transfer rate error, a read/write timing error, or a write inhibit at the disk drive occurs during a data transfer, the error logic unit 201 applies a logic zero signal to line 202 to disable gate 308 and thereby set flip-flop 309. The gate 310 is disabled thereby and no further data transfers can take place.

The logic unit 201 in addition senses lines 226a and 226b during a data transfer to sense data underruns and overruns. If the input register to buffer 300 remains filled longer than 0.40 microseconds, during a data transfer from disk adapter 14 to MPDC 10, a data overrun is indicated and the error logic unit 201 sets the flip-flop 309 as before described. The logic unit also sets the flip-flop 309 when the output register of buffer 300 remains empty longer than 0.40 microseconds during a data transfer from the MPDC to the disk adapter.

FIG. 4

Figure 4:
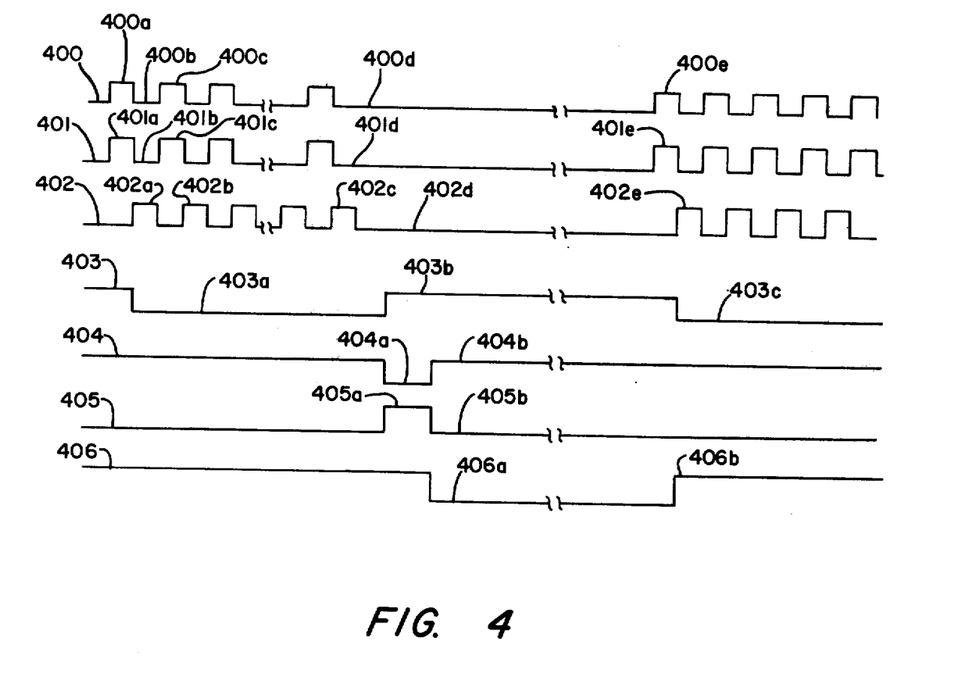
FIG. 4 is a timing diagram illustrating the operation of the system of FIG. 3 during a transfer of data from main memory to the disk adapter.

FIG. 4 illustrates in graphic form the timing of the operation of the logic system of FIG. 3 during a data transfer between the MPDC 10 and the disk adapter 14.

A discrete waveform 400 illustrates the output of AND gate 302a, and discrete waveform 401 illustrates the output of AND gate 310. Discrete waveform 402 illustrates the logic one strobe pulses supplied by the MPDC to control line 205c leading to the S1 input of multivibrator 311. Discrete waveform 403 illustrates the $\overline{Q}$ output of the multivibrator 311, and discrete waveform 404 illustrates the $\overline{Q}$ output of flip-flop 309. Discrete waveform 405 illustrates the Q output of flip-flop 309, and discrete waveform 406 illustrates the logic signals applied by firmware to control line 204a leading to the reset input of flip-flop 309.

When data is to be read from the memory 12 of FIG. 1 and transferred to the disk adaptor 14, the MPDC initializes the system of FIG. 3 as before described. Before a first data byte is received from the MPDC at the input register of the FIFO buffer 300, the line 301a and the output of AND gate 302a are at a logic one level as is indicated by pulse 400a of waveform 400. The output of AND gate 310 thus transitions to a logic one level synchonous with pulse 400a as indicated by pulse 401a of waveform 401. The pulse 401a signals the MPDC to transfer a data byte to the FIFO buffer 300. Synchronous with the trailing edge of the pulse 401a, the MPDC issues a pulse 402a of waveform 402 to load a data byte into buffer 300 and to strobe the S1 set input of the one-shot multivibrator 311. Concurrently, the $\overline{Q}$ output of the multivibrator transitions to a logic zero level as indicated by waveportion 403a of waveform 403. With the $\overline{Q}$ output of the multivibrator at a logic zero level, the flip-flop 309 remains in a quiescent state and the $\overline{Q}$ output of the flip-flop remains at a logic one level as indicated by waveform 404. The Q output of the flip-flop remains at a logic zero level as indicated by waveform 405.

As data bytes are received by the input register of the FIFO buffer 300 from the MPDC, the output of gate 302a transitions to a logic zero as indicated by waveportion 400b. In response thereto, the output of gate 310 also transitions to a logic zero as indicated by waveportion 401b. When the data byte is transferred into the FIFO stack and the input register again is empty, however, the outputs of gates 302a and 310 again transition to a logic one as indicated by pulses 400c and 401c, respectively. The MPDC thus receives an additional data byte request, and upon the occurrence of the trailing edge of pulses 400c and 401c, the MPDC issues a logic one pulse 402b to again strobe the S1 set input of multivibrator 311. The data flow continues as above described until the FIFO buffer 300 is filled. In that event, the outputs of gates 302a and 310 again transition to a logic zero as indicated by reference numbers 400d and 401d, respectively. When no further data requests are issued, the MPDC 10 ceases to strobe the S1 set input of multivibrator 311. Line 205c thus remains at a logic zero level as indicated by reference number 402d.

When the MPDC delays more than 0.50 microseconds in strobing the multivibrator 311, the multivibrator times out and the $\overline{Q}$ output thereof transitions to a logic one level as indicated by waveportion 403b. The flip-flop 309 is triggered thereby, and the $\overline{Q}$ output thereof transitions to a logic zero level as indicated by waveportion 404a. The Q output of the flip-flop transitions to a logic one level as indicated by waveportion 405a.

The firmware control system of the MPDC 10 senses the logic level of waveportion 405a, and issues a logic zero signal to the control line 204a to reset the flip-flop 309 as indicated by waveportion 406a. Synchronous therewith the Q output of flip-flop 309 transitions to a logic zero level as indicated by reference number 405b, and the $\overline{Q}$ output of the flip-flop transitions to a logic one level as indicated by reference number 404b. The firmware control system of the MPDC at this time accesses the common bus 13 to service bus requests.

When the input register of FIFO buffer 300 is emptied, the outputs of gates 302a and 310 again transition to a logic one level as indicated by pulses 400e and 401e, respectively. The firmware control system of the MPDC thereupon applies a logic one signal to line 204a as indicated by waveportion 406b to enable the trigger input to flip-flop 309. Synchronous therewith, the MPDC strobes the S1 set input of multivibrator 311, and the $\overline{Q}$ output of the multivibrator transitions to a logic zero level as indicated by waveportion 403c. The $\overline{Q}$ output of flip-flop 309 thus remains at a logic one level as indicated by waveform 404 and the Q output of the flip-flop remains at a logic zero level as indicated by waveform 405. The data process then continues as before described.

FIG. 5

Figure 5:
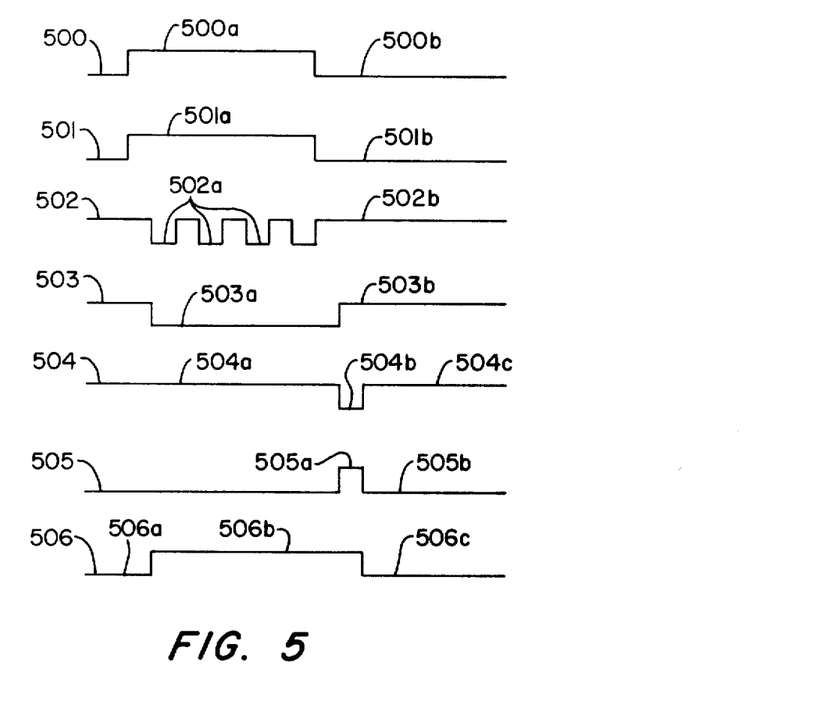
FIG. 5 is a timing diagram illustrating the operation of the system of FIG. 3 during a transfer of data from the disk adapter to main memory.

FIG. 5 illustrates in graphic form the timing of the operation of the logic system of FIG. 3 during a data transfer from the disk adapter 14 to the MPDC 10.

A discrete waveform 500 illustrates the output of AND gate 302b, and a discrete waveform 501 illustrates the output of AND gate 310. A discrete waveform 502 illustrates the negative-going logic zero strobe pulses supplied by the MPDC to control line 205d leading to the S2 input of multivibrator 311. A discrete waveform 503 illustrates the $\overline{Q}$ output of the multivibrator 311, and a discrete waveform 504 illustrates the $\overline{Q}$ output of flip-flop 309. A discrete waveform 505 illustrates the Q output of flip-flop 309, and a discrete waveform 506 illustrates the logic signals supplied by firmware to control line 204a leading to the reset input of flip-flop 309.

When data is to be transferred from the disk adapter 14 to the MPDC 10, the MPDC applies logic zero signals to lines 301b and 301c to disable gate 302a. The MPDC further applies logic one signals to lines 303b and 303c to enable gate 302b. The MPDC also applies a logic zero signal to line 205c to disable the S1 set input to multivibrator 311. The remainder of the system initialization is as before described in connection with the description of FIG. 3.

At the time lines 303b and 303c transition to a logic one level, the MPDC 10 requests a first data byte from the disk adapter 14. In addition the firmware control system of the MPDC issues a logic zero signal as illustrated by waveportion 506a to reset flip-flop 309. The $\overline{Q}$ output of flip-flop 309 thus is raised to a logic one level to enable gate 310 to signal the occurrence of data in the output register of buffer 300.

In response to the MPDC data request, data is fed serially from the disk adapter 14 to the input register of the FIFO buffer 300 at a 2.50 MHz bit transfer rate. During the time period in which buffer 300 is being filled, the firmware control system accesses the common bus 13 to service unsolicited bus requests. When the FIFO buffer 300 is filled, line 303a leading from the output register of the buffer transitions to a logic one level. The output of the gates 302b and 310 thereupon transition to a logic one level as indicated by waveportions 500a and 501a, respectively. The MPDC 10 senses the logic one output of gate 310, and in response thereto the firmware control system of the MPDC issues a logic one level to line 204a, as illustrated by waveportion 506b to permit flip-flop 309 to respond to trigger pulses from multivibrator 311. The MPDC also issues a series of negative-going logic zero pulses as illustrated by pulses 502a to the S2 set input of multivibrator 311. The $\overline{Q}$ output of multivibrator 311 thereby is held at a logic zero level as illustrated by waveportion 503a, and the $\overline{Q}$ output of flip-flop 309 remains at a logic one level as illustrated by waveportion 504a. The MPDC further accesses the output register of FIFO buffer 300 to empty the buffer.

When the output register of FIFO buffer 300 is emptied, lines 226b and 303a transition to a logic zero level which is gated to the outputs of gates 302b and 310 as illustrated by waveportions 500b and 501b, respectively. The MPDC 10 thereupon ceases to supply negative-going logic zero pulses to multivibrator 311 as illustrated by waveportion 502b. The multivibrator thus times out, and $\overline{Q}$ output thereof transitions to a logic one level as illustrated by waveportion 503b. The flip-flop 309 is triggered thereby, and the logic one level at the output of NOR gate 304 is transferred to the Q output of the flip-flop as illustrated by waveportion 505a. The $\overline{Q}$ output of the flip-flop transitions to a logic zero level as indicated at 504b. The firmware control system of the MPDC 10 senses the logic one level at the Q output of the flip-flop, and applies a logic zero signal illustrated by waveportion 506c to line 204a to reset the flip-flop. The Q output of the flip-flop thereupon transitions to a logic zero as indicated at 505b of waveform 505, and the $\overline{Q}$ output of the flip-flop again transitions to a logic one level as indicated by waveportion 504c. The firmware control system thereupon accesses the common bus 13 to service unsolicited bus requests. The serial data flow from the disk adapter 14, however, is not interrupted, and continues to fill the input register of the buffer.

No further data strobes are issued to the MPDC until the FIFO buffer 300 again is filled. In that event, the lines 226b and 303a again transition to a logic one level which is gated through AND gates 302b and 310. The MPDC thereupon is signalled to again empty the FIFO buffer 300, and the process proceeds as before described.

Having described the invention in connection with certain specific embodiments thereof, it is to be understood that further modifications may now suggest themselves to those skilled in the art and it is intended to cover such modifications as fall within the scope of the appended claims.

What is claimed is:

1. A data transfer control system for signalling the occurrence of a time period during which an asynchronous common communication bus may be accessed by a firmware control system during a data transfer between a main memory and a mass storage device without compromising the data transfer rate or incurring data errors, said bus electrically linking said main memory, said firmware control system, and a mass storage control unit in electrical communication with a disk adapter controlling the operation of said mass storage device, which includes:
- (a) memory means in electrical communication with said disk adapter and said control unit for transferring data asynchronously therebetween and indicating both the presence of input data and the occurrence of a filled condition in said memory means;
- (b) logic gate means responsive to the indications from said memory means and control signals from said control unit for providing data strobes to synchronize the flow of data between said memory means and said control unit; and
- (c) logic timing means in electrical communication with said control unit and said logic gate means for issuing a control signal to said firmware control system indicating the occurrence of said time period.

2. The combination set forth in claim 1, wherein said memory means is a first-in-first-out buffer having an input register which signals the absence of data and an output register which signals the presence of data.

3. The combination set forth in claim 2, wherein said logic gate means includes:
- (a) a first AND gate in electrical communication with said input register and said control unit;
- (b) a second AND gate in electrical communication with said output register and said control unit;
- (c) an OR gate having inputs connected to the outputs of said first AND gate and said second AND gate;
- (d) an even plurality of serially connected inverters connected to the output of said OR gate;
- (e) a third AND gate having a first input connected to the output of said plurality of inverters;
- (f) a fourth AND gate receiving range and data transfer control signals from said control unit and having an output connected to a second input of said third AND gate; and
- (g) a fifth AND gate having a first input connected to the output of said third AND gate and a second input responsive to said logic timing means to provide said data strobes.

4. The combination set forth in claim 3 wherein said logic timing means includes:
- (a) a sixth AND gate in electrical communication with said control unit and said disk adapter;
- (b) a monostable multivibrator in electrical communication with said control unit;
- (c) a NOR gate having one input connected to the output of said OR gate and a second input connected to the output of said fifth AND gate; and
- (d) a flip-flop in electrical communication with said NOR gate, and responsive to said multivibrator, said sixth AND gate and said firmware control system, and having one output connected to said second input of said fifth AND gate and a second output in electrical communication with said firmware control system for signalling the occurrence of a time period during which said bus may be accessed.

5. A logic control system operating under the control of both hardware and firmware control means in a data processing system having an asynchronous communication bus electrically linking a main memory, and a disk controller which in turn is in electrical communication with a disk adapter controlling the operation of a mass storage disk system, which includes:
- (a) first-in-first-out buffer means in electrical communication with said disk adapter and said disk controller for transferring data asynchronously between said disk system and said main memory;
- (b) first logic means responsive to signals from said disk controller and said buffer means for requesting a data transfer between said buffer means and said disk controller; and
- (c) second logic means in electrical communication with said firmware control means, said disk controller and said first logic means for signalling the existance of a data transfer time period during which said firmware control means can service bus requests on said common bus without incurring data errors or interfering with the data transfer rate between said disk system and said main memory.

* * * * *